(12) United States Patent
Pinkerton

(10) Patent No.: US 8,582,163 B2
(45) Date of Patent: *Nov. 12, 2013

(54) SYSTEMS AND METHODS FOR IMPROVING PERFORMANCE OF TRIGONOMETRIC AND DISTANCE FUNCTION CALCULATIONS DURING PRINTING AND DISPLAY

(71) Applicant: Glenn Pinkerton, Lafayette, CO (US)

(72) Inventor: Glenn Pinkerton, Lafayette, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/736,300

(22) Filed: Jan. 8, 2013

(65) Prior Publication Data

US 2013/0120798 A1   May 16, 2013

Related U.S. Application Data

(62) Division of application No. 12/824,576, filed on Jun. 28, 2010.

(51) Int. Cl.
*G06F 3/12* (2006.01)

(52) U.S. Cl.
USPC ........ 358/1.15; 358/1.13; 358/1.14; 358/463; 347/15

(58) Field of Classification Search
None
See application file for complete search history.

(56) References Cited

U.S. PATENT DOCUMENTS

| | | | |
|---|---|---|---|
| 7,054,021 B2 * | 5/2006 | Sesek et al. | 358/1.15 |
| 8,223,353 B2 * | 7/2012 | Caruso et al. | 358/1.13 |
| 2008/0246794 A1 * | 10/2008 | Yamazaki et al. | 347/15 |
| 2009/0051979 A1 * | 2/2009 | Tai et al. | 358/463 |

* cited by examiner

*Primary Examiner* — Dung Tran
(74) *Attorney, Agent, or Firm* — Finnegan, Henderson, Farabow, Garrett & Dunner, L.L.P.

(57) ABSTRACT

Consistent with disclosed embodiments, systems and methods for optimizing printing of a print job comprising graphics by a printer are presented. In some embodiments, the method calculating optimal granularity for the print job, based on specified resolution and page size; generating at least one trigonometric table with the calculated granularity; determining if a job command in the print job comprises a trigonometric function; and, if so, obtaining at least one trigonometric value from the at least one trigonometric table based on information in the job command. A similar process may be used to optimize printing by reducing the number of distance calculations performed by using sub tables.

5 Claims, 5 Drawing Sheets

SYSTEMS AND METHODS FOR IMPROVING PERFORMANCE OF TRIGONOMETRIC AND DISTANCE FUNCTION CALCULATIONS DURING PRINTING AND DISPLAY

This is a division of application Ser. No. 12/824,576, filed Jun. 28, 2010, which is incorporated herein by reference.

BACKGROUND

1. Technical Field

The present disclosure pertains to the field of image outputting and, in particular, to systems and methods for optimizing performance of printing or display when outputting graphical objects.

2. Description of Related Art

Printer software is continually evolving to process higher level page description and page layout languages. Examples of higher-level languages include Open Office XML ("OOXML"), Unstructured Operation MarkupLanguage ("UOML"), and Open Document Format ("ODF"), to name just a few. While lower level languages provide specific parameters for outputting images to a printed page, higher level languages generally provide the data to the printer with looser guidelines for formatting and rendering of the data in the specified format. Therefore, in higher level languages, more calculation steps are performed to convert the high level objects, such as graphs, charts and surfaces, into more primitive graphical objects, such as points and lines, in preparation for rendering. These calculations frequently involve a large number of trigonometric and distance function calculations.

For example, FIG. 1 shows the principles of trigonometry. The sine, cosine, and tangent functions may be used to calculate a point location relative to another point location, given a distance and an angle, or two distances. For example, as shown in FIG. 1, the distance X may be obtained by calculating the product of the distance from A to B (hypotenuse of the right triangle) and the cosine of the angle C. The distance Y may be obtained by calculating the product of the distance from A to B (hypotenuse) and the sine of the angle C.

Calculating a trigonometric function (sine, cosine, or tangent) generally involves calculating several steps in a series approximation of the function. For example, a Taylor Series expansion may require 6 to 10 terms depending on the value of the angle. This can become a time consuming bottleneck and impede the performance of a printer or display device when a large number of trigonometric functions need to be calculated. Calculating a distance traditionally needs a square root calculation, which also involves a series approximation and many computations.

The conventional approach to improving the performance of printing or display devices when outputting graphics is to use lookup tables to avoid making trigonometric calculations. The sine, cosine, and/or tangent values for many different angles are calculated a priori and stored in a table. During printing or display, when a trigonometric value is needed, the output device will use the value corresponding to the angle closest to the angle desired. While this approach may reduce the number of computations performed, the resulting calculations are less precise, and lead to an unknown trade-off between resource usage and accuracy. For calculating distance, a square root table can be used in a similar fashion, with even less certainty in the trade-off between table size (resource usage) and accuracy.

SUMMARY

Consistent with disclosed embodiments, systems and methods for optimizing printing of a print job comprising graphics by a printer are presented. In some embodiments, the method comprises determining optimal granularity for the print job, based on specified resolution and page size; generating at least one trigonometric table with the calculated granularity; determining if a job command in the print job comprises a trigonometric function; and, if so, obtaining at least one trigonometric value from the at least one trigonometric table based on information in the job command.

In some embodiments, the method comprises determining number of sub tables for the print job, based on specified resolution and page size; generating at least one distance sub table, each sub table comprising a range of distance-squared values, each value in a sub table separated from the next value in the same sub table by a distance-squared increment for the sub table; determining if a job command in the print job comprises a distance function; and if so, obtaining at least one distance value from the at least one distance table based on information in the job command.

Embodiments disclosed also relate to methods created, stored, accessed, or modified by processors using computer-readable media or computer-readable memory. These and other embodiments are further explained below with respect to the following figures.

DETAILED DESCRIPTION

Systems and methods for improved printing are presented. These techniques may be extended in various ways as would be apparent to one of ordinary skill in the art. For example, the principles of the embodiments described below may also be applied to the display of graphics to certain display devices.

Figure 1:
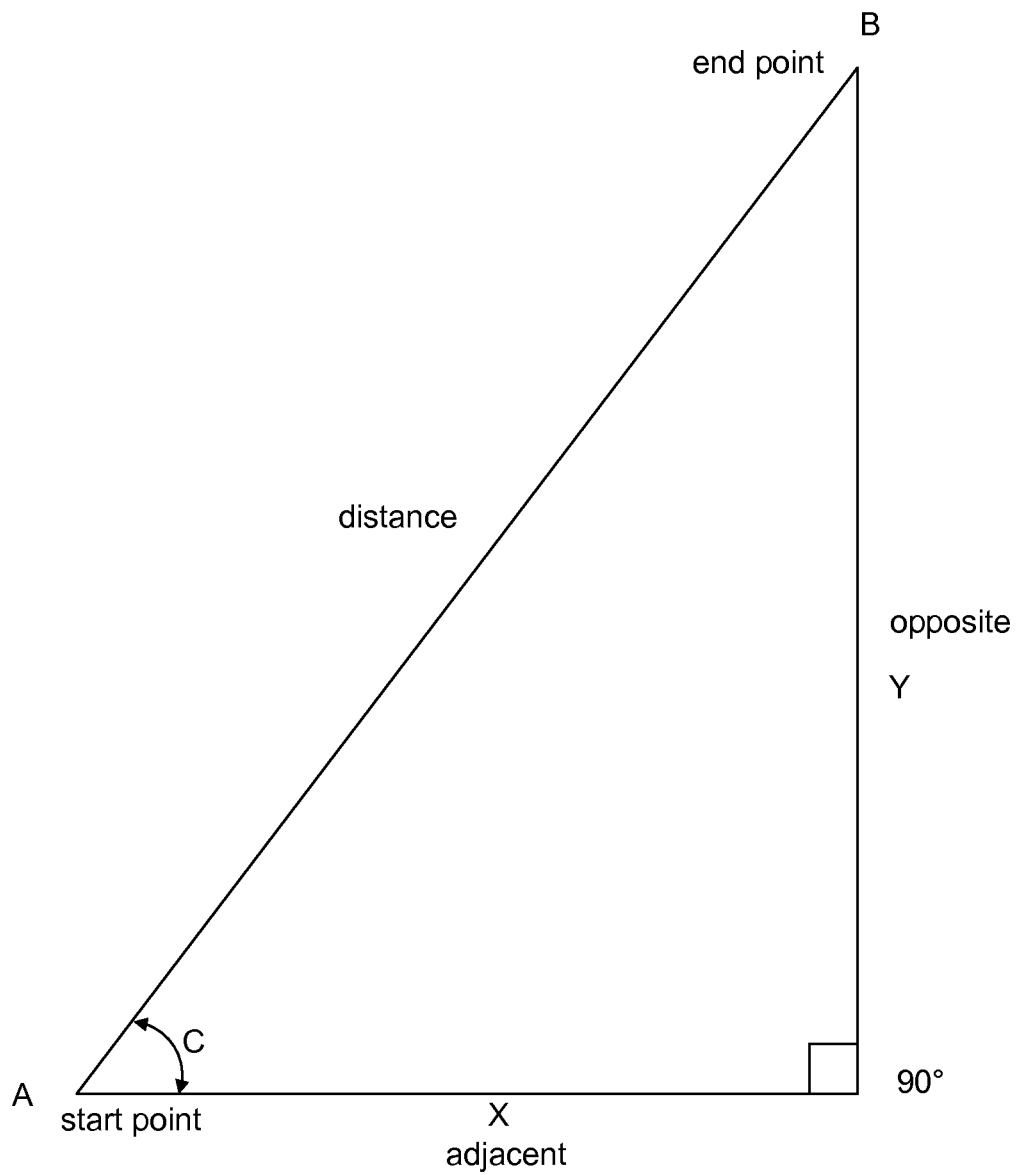
FIG. 1 illustrates the principles of trigonometry.
Figure 2:
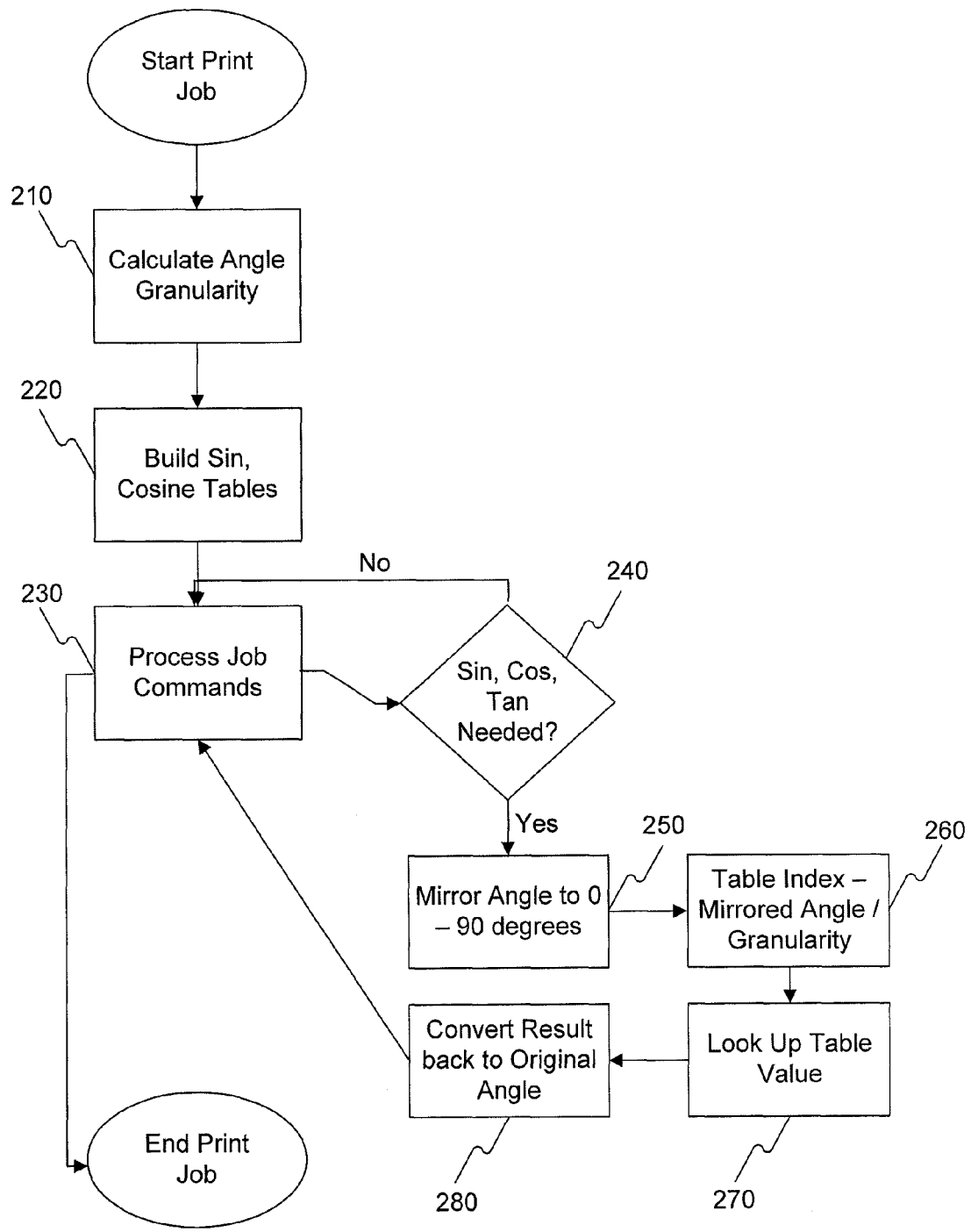
FIG. 2 is a flowchart illustrating an exemplary method for improved printing by reducing trigonometric computations consistent with the principles of the presently-claimed invention.

FIG. 2 is a flowchart illustrating an exemplary method for improved printing by reducing trigonometric computations consistent with the principles of the presently-claimed invention. At the start of the print job, the size (height and width) of the page and desired resolution are known. Resolution may be expressed, for example, as number of pixels per inch (ppi).

One way to optimize the performance of printing systems consistent with embodiments of the presently-claimed invention is to only calculate with sufficient accuracy for the particular print job. The degree of precision required for a particular job may be determined by calculating the angle granularity based on the page size and resolution.

In step 210, an optimal angle granularity for the print job is determined. In general, when calculating the location of a pixel to be printed, the calculations need only be accurate to the size of a single pixel on the page, because calculations are rounded off to approximate a pixel position within the page.

An optimal level of granularity, therefore, will vary based on the resolution desired and the size of the page for a particular print job.

Figure 3:
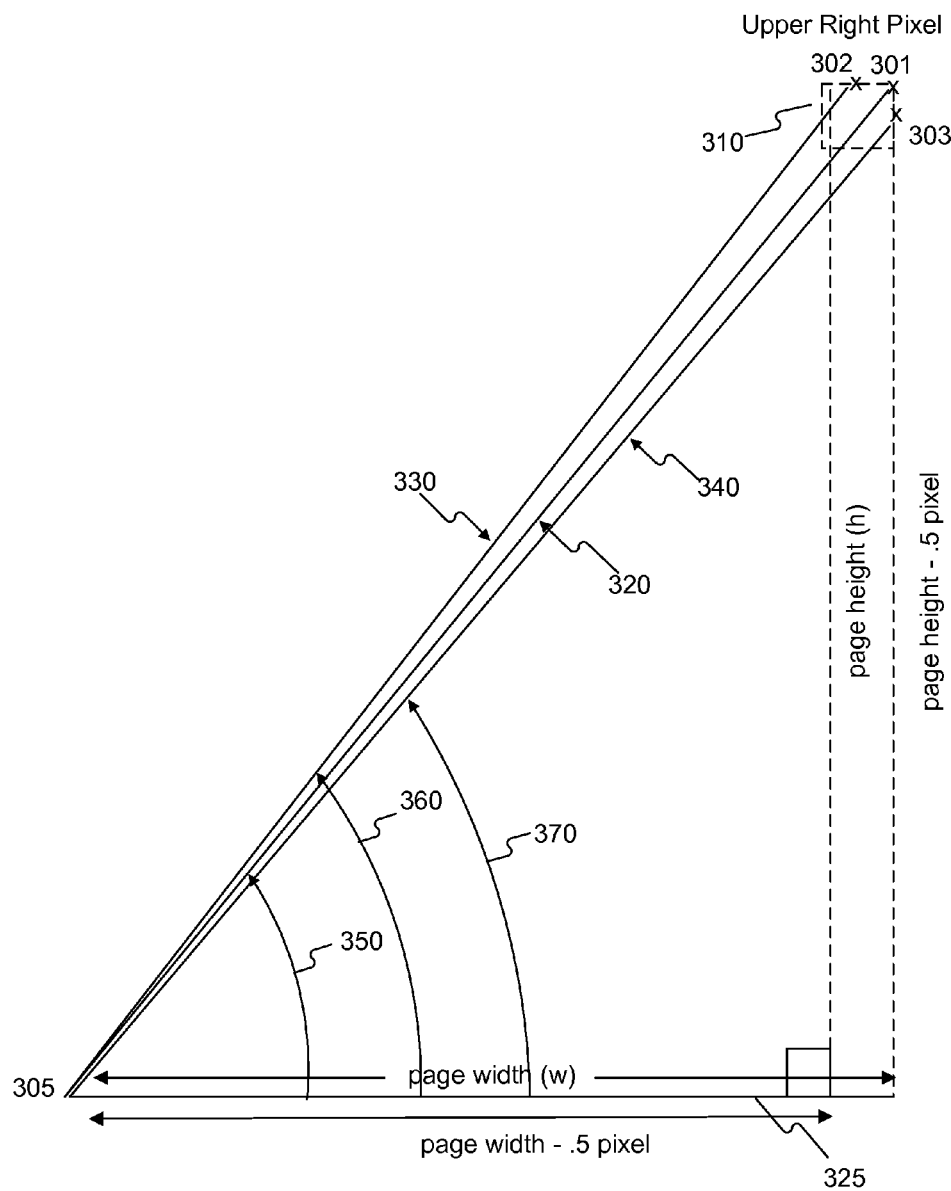
FIG. 3 illustrates trigonometric calculations for a very small angular increment of interest.

FIG. 3 illustrates trigonometric calculations for calculating a very small angular increment of interest given a specified page size and resolution. In FIG. 3, pixel 310 (indicated by the box) is the uppermost right pixel of the printing area on the page as determined based on the page size. To determine the angle 350 formed between line 320 (drawn between point 305 and point 301) and line 325 across the bottom of the triangle, calculate the arc tangent (or inverse tangent) of the page height (h) divided by page width (w). This may be represented as x=arctan (h/w). For example, on a page that is 8½ inches by 11 inches, with one inch margins, the printed area will have a height of 9 inches, and a width of 6½ inches. In this example, angle 350 will be 54.162347 degrees.

The angle between either of lines 330 or 340 and line 325 is also calculated. To determine the angle 360 formed between line 330 and line 325, the arc tangent of page height (h) divided by page width (w) minus 0.5 pixel width. In other words, angle 360 may be calculated as y=arctan (h/w−0.5 pixel width). Angle 370 may be similarly calculated as z=arctan (h−0.5 pixel width/w).

For a resolution of 300 pixels per inch (ppi), pixel width is 0.00333 . . . . Therefore, continuing with the example above, angle 360 would be y=arctan(9/6.498333, . . . ) or 54.169320 degrees, Angle 370 would be z=arctan(8.93333 . . . /6.5) or 54.157310 degrees.

Next, the minimum absolute difference between the first angle (x), and either the second (y) or third (z) angles is calculated. In this example, the absolute difference |x−y|=0.006973. This would indicate that a granularity (G) of less than 0.001 in this example would not improve performance.

Returning now to FIG. 2, once granularity is determined, in step 220, tables of sine, cosine, and tangent values for angles between 0 and 90 degrees may be built. The sine, cosine, and tangent tables will be referred to herein as trigonometric tables, and may take the form of one or multiple tables. In one embodiment, a trigonometric table is created with all possible sine, cosine, and tangent values, each entry in the table separated from its neighbor by the calculated granularity. In certain embodiments, only a subset of all possible sine, cosine, and tangent values may be calculated. In this case, the subset may be the most likely used sine, cosine, and tangent values, or the subset may be determined based on certain factors, such as characteristics of the particular print job. In certain cases, the subset generated may, for example, be determined by the resolution or the type of graphics in the print job. In some embodiments, the subset of trigonometric values generated may be determined based on printer characteristics. If, for example, the printer is capable of printing in only certain sizes or resolutions, this may reduce the number of trigonometric values that will be most used.

In the exemplary method of FIG. 2, the trigonometric tables are generated at the start of the print job. In certain embodiments, the granularity may be set before the start of the print job, and the trigonometric tables calculated, stored, and reused for multiple print jobs. In certain embodiments, a set of tables for each possible combination of page size and resolution for the printer may be built. This may increase efficiency and speed of a printer particularly if, for example, the printer supports a small number of page size and resolution combinations. In certain embodiments, only the most common sizes and resolutions may be stored in the table, and less frequently used size and resolution combinations may have their trigonometric tables calculated at the start of a print job in which the less common size and resolution is chosen.

In step 230, the print job commands are processed. In most cases, a print job sent to a printer consists of a sequence of commands that may be organized as a file or which may be transmitted serially. In embodiments consistent with the presently-claimed invention, commands are processed to determine if a trigonometric function will be used in generating the printed image (step 240). There may be some commands where trigonometric function will not be needed. If this is the case, the method continues with processing the next job command (step 230), until all job commands in the print job are processed.

If it is determined that a trigonometric function is needed (step 250), the degree of the angle in the function will be considered. Consistent with the presently-claimed invention, only trigonometric tables for angles in the 0 to 90 degree range need be calculated. If the angle needed is not between 0 and 90 degrees, the angle will be mirrored into an angle between 0 and 90. The mirrored angle is divided by the granularity and rounded to get the index into the table of trigonometric values (step 260). The temp values for sine and cosine at the index are retrieved (step 270).

From the temp sine and cosine values, the original angle is obtained (step 280). For example, if the angle needed for the calculation is −37 degrees, this is the original angle. Negative angles between 0 and −90 will be mirrored to the absolute value of the angle or, in this case, to +37 degrees. The method would use the look up value for +37 degrees. For a sine function, the negative of the entry in the trigonometric table is returned. For the cosine function, no change is made to the value of the entry in the trigonometric table, and the value itself is returned.

If an angle needed for the calculation is greater than 90 degrees, then the supplement of the angle (180°−A) is determined. For example, if an original angle of 120 degrees is specified, the angle is mirrored to +60 degrees, and the values for +60 degrees are looked up in the trigonometric tables. The final sine value is the same as the table value, and the final cosine value is the negative of the table value. When a tangent is needed, the values for both sine and cosine are obtained and the tangent is calculated as the sine/cosine ratio.

The logic of this process is illustrated in the following pseudo code.

```
If orig angle between 0 and 90, temp angle = orig angle
If orig angle between 90 and 180, temp angle = 180 − orig angle
If orig angle between 180 and 270, temp angle = orig angle − 180
If orig angle between 270 and 360, temp angle = 360 − orig angle
Table index = temp angle divided by granularity, rounded to nearest integer.
Temp sin value = sin table [table index]
Temp cosine value = cosine table [table index]
If orig angle between 0 and 90, final cosine = temp cosine and final sin = temp sin
If orig angle between 90 and 180, final cosine = −temp cosine, final sin = temp sin
If orig angle between 180 and 270, final cosine = −temp cosine, final sin = −temp sin
If orig angle between 270 and 360, final cosine = temp cosine, final sin = −temp sin
```

After the trigonometric values are obtained from the tables, the next print command is processed (step 280). This process continues until the image is rendered and the print job is over.

Distance Calculations

A similar process may be used to optimize printing by reducing the number of distance calculations performed. FIG.

4 is a flowchart illustrating an exemplary method for improved printing by reducing distance calculations consistent with the principles of the presently-claimed invention.

In general, for calculation of distances, the size and resolution of the page may be used to build some number of tables of distances corresponding to the x and y differences between points. In some embodiments, distance values for each resolution increment along the diagonal line from corner to corner of the page are calculated and stored in sub tables. The square of the distance value may also be stored in some or all of the tables. In certain embodiments, the tables each have enough values to allow a linear distribution of distance-squared values that will produce distance values accurate to the resolution of the page.

Figure 4:
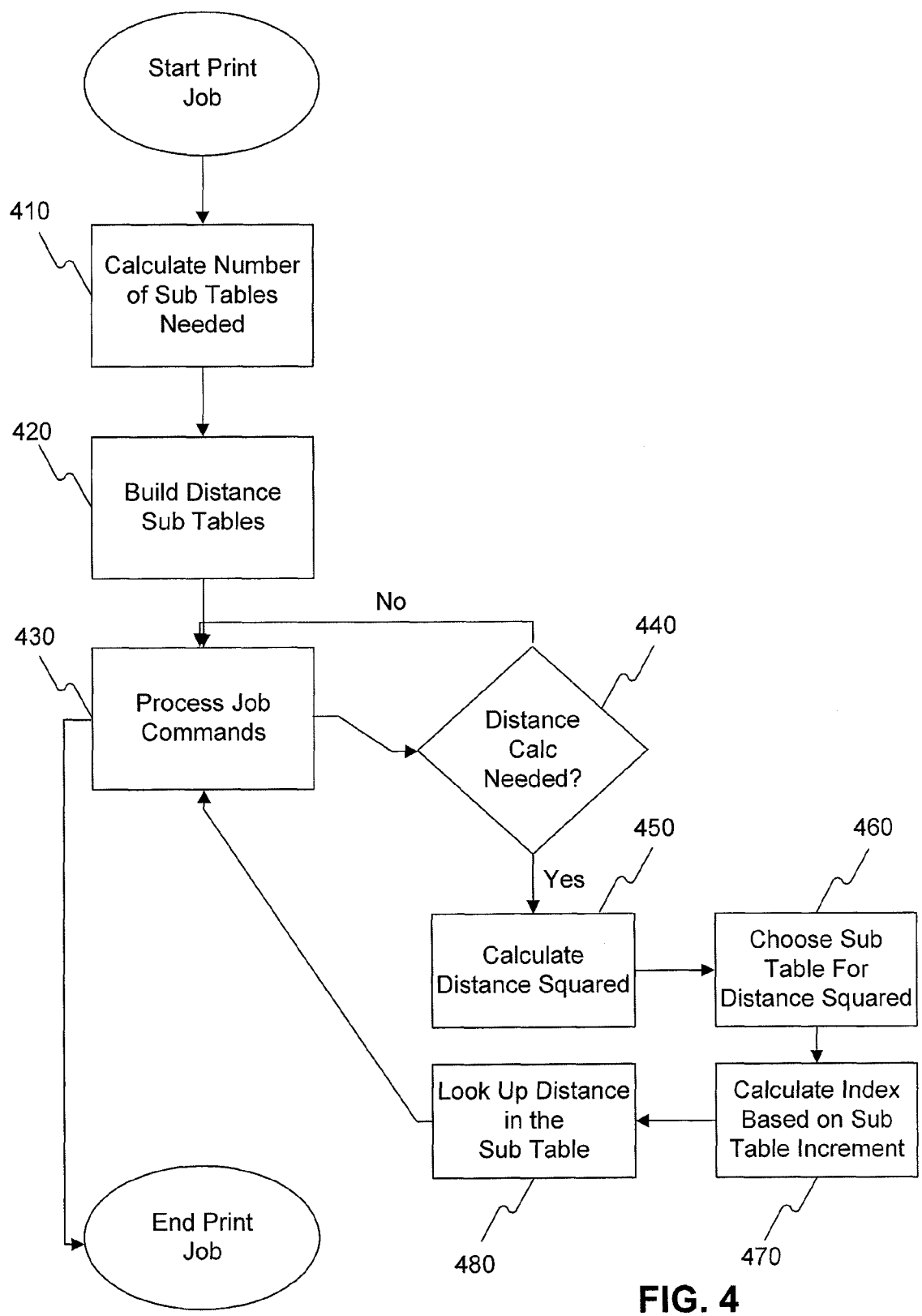
FIG. 4 is a flowchart illustrating an exemplary method for improved printing by reducing distance calculations consistent with the principles of the presently-claimed invention.

As shown in FIG. 4, in some exemplary methods, the distance calculations are stored in some number of sub tables. The number of sub tables may be calculated prior to the start of the print job or, as shown in FIG. 4, may be calculated after the print job has been sent (step 410).

In certain embodiments, the number of sub tables is determined in order to optimize table size. For example, for a hypothetical page with 1000 pixels in both width and height, the maximum distance between any two pixels on the page would be sqrt (1000*1000+1000*1000), or about 1414. The maximum distance squared would be 2000000. A distance-squared resolution of 1.414 would be needed to produce a one-pixel accuracy, making for a very large table if that distance-squared resolution is used for the entire table. To optimize the table size, in some embodiments, the table may be split into multiple tables. In some embodiments, the value of the distance squared is used to build the tables and/or determine which entries are in which tables. For example, for a small distance squared, from 0 to 100, an increment of 1.414 to index may be used, which results in about 70 table values for this range, with at least one pixel accuracy in the final distance value. For distance-squared values from 100 to 1000, for example, an increment of 14.14 may be used which will provide one pixel distance accuracy with about 70 table values within this range. In a similar fashion, distance-squared values from 1000 to 10000 should have an increment of 141.4, distance-squared values from 10000 to 100000 should have an increment of 1414, and each subsequent sub table will have an increment 10 times higher for the next range. In general, the number of sub tables is the log base 10 of the maximum distance squared for a page.

In this hypothetical example, six sub tables would be generated as follows.

| Distance Squared Range | Distance Squared Increment |
|---|---|
| 0-100 | 1.414 |
| 100-1000 | 14.14 |
| 1000-10000 | 141.4 |
| 10000-100000 | 1414 |
| 100000-1000000 | 14140 |
| 1000000-10000000 | 141400 |

In this example, each sub table will have very nearly 70 values, for a total of about 420 values.

As mentioned above, these sub tables can be calculated at the start of a print job, based upon the page size and resolution of the print job, or they can be pre-calculated and stored in the printer. For a printer with few size and resolution options, the sub tables may be pre-calculated and permanently stored. For more size and resolution options, the sub tables for commonly used sizes and resolutions may be pre-calculated and permanently stored. Less common sizes and resolutions may have their sub tables calculated at the start of the print job. In the exemplary method shown in FIG. 4, some number of distance tables are built after the print job is received (step 420).

In step 430, the print job commands are processed. As mentioned above, a print job sent to a printer consists of a sequence of commands that may be organized as a file or which may be transmitted serially. In embodiments consistent with the presently-claimed invention, commands are processed to determine if a distance calculation will be used in generating the printed image (step 440). If no distance calculation is needed, the method continues with processing the next job command (step 430), until all job commands in the print job are processed.

When a distance calculation is needed between two points, first the distance squared is computed (step 440) and the sub table for the distance squared is chosen (step 460). For example, in some embodiments, each sub table can be identified by the minimum distance-squared value to which the sub table applies, the maximum distance-squared value to which the sub table applies, and the distance-squared increment between actual distance values in the sub table. The input distance-squared value is compared to the minimum and maximum distance-squared values for each sub table. When the distance-squared value of interest lies between the minimum and maximum, inclusive, for the sub table, that sub table is used to select the actual distance.

A binary search of a sorted list of the sub tables will quickly determine which sub table to use, along with the distance-squared minimum, and the distance-squared increment for that sub table. The index into the sub table is calculated based on the sub table increment (step 470). For example, the sub table index may be calculated as the distance squared input minus the minimum distance-squared value of the sub table, all divided by the distance-squared increment of the sub table. For one particular example, the total number of operations is reduce to the following:

| | |
|---|---|
| Binary Search of Sorted Sub Table List | 4 compares max |
| Retrieval of Sub Table Minimum and Increment | 2 retrieves |
| Calculate Sub Table Index | 1 subtract and 1 divide |
| Retrieve distance from sub table | 1 retrieve |

This small number of operations can be performed using a small amount of memory, and the total number of operations performed will be much less than the tens to possibly hundreds of floating point operations needed to calculate a square root via the traditional square root function.

In step 480, the index into the sub table is used to obtain the distance from the appropriate distance sub table. The obtained distance will be used to print the image. The method continues until all print job commands are processed.

Figure 5:
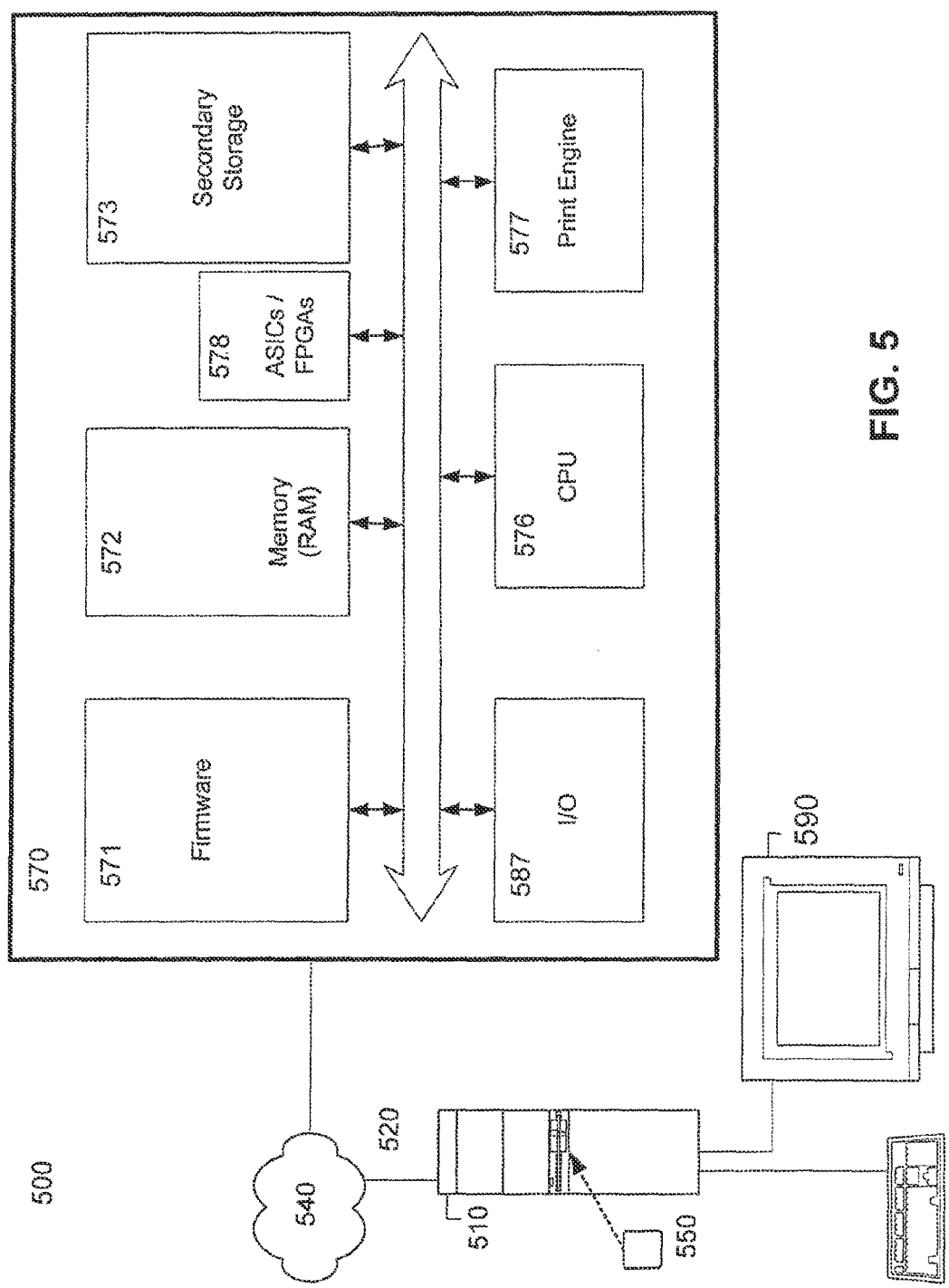
FIG. 5 shows a high-level block diagram of an exemplary system 500 for performing efficient computation of trigonometric and distance calculations consistent with the presently-claimed invention.

FIG. 5 shows a high-level block diagram of an exemplary system 500 for performing efficient computation of trigonometric and distance calculations. In general, a computer software application consistent with disclosed embodiments may be deployed on system 500, which can include networked computers 510 and printers 570 that are connected through communication links that allow information to be exchanged using conventional communication protocols and/or data port interfaces.

As shown in FIG. 5, exemplary system 500 includes computer or computing device 510 and printer 570, which are coupled using network 540. Network 540 may include subnets, Local Area Networks (LANs), and/or Wide Area Networks (WANs). Further, network 540 may also include modems, routers, repeaters, and other communication devices (not shown) that permit peripherals that are coupled to a network 540 to communicate with other devices over wired or wireless connections in accordance with the policies set by a network administrator.

In general, computing device 510 may be a computer workstation or desktop computer, laptop or portable computer, handheld device, or any other mobile computing device capable of being used in a networked environment. Computing device 510 and printer 570 may be capable of executing software (not shown) that performs the methods described in FIGS. 2 and 4.

Computing device 510 and printer 570 may contain removable media drives 550. Removable media drives 550 may include, for example, 3.5 inch floppy drives, CD-ROM drives, DVD ROM drives, CD±RW or DVD±RW drives, USB flash drives, Memory Sticks™, Secure Digital High Capacity ("SDHC") cards, and/or any other removable media drives consistent with embodiments of the presently-claimed invention. Portions of software applications consistent with the exemplary embodiments described herein may reside on removable media and be read and executed by computing device 510 using removable media drive 550. In some embodiments, trigonometric or distance tables may be stored on removable media.

Printers 570 may be laser printers, ink jet printers, LED printers, plotters, and of various other types. From a functional perspective, printers 570 may take the form of computer printers, facsimile machines, digital copiers, multifunction devices, and/or various other devices that are capable of printing documents.

Connection 520 couples computing device 510 and printer 570 to network 540. Connection 520 may be implemented as a wired or wireless connection using appropriate conventional communication protocols and/or data port interfaces. In general, connection 520 can be any communication channel that allows transmission of data between the devices. In one embodiment, for example, devices may be provided with data ports, such as USB™, SCSI, FIREWIRE™ and/or BNC ports for transmission of data through the appropriate connection 520. The communication links could be wireless links or wired links or any combination that allows communication between computing device 510 and printer 570.

Printer 570 may be controlled by hardware, firmware, or software, or some combination thereof. A computer software application to for performing the methods of FIGS. 2 and/or 4 may be deployed on at least one of exemplary computer 510 and/or printer 570, as shown in FIG. 5. For example, printer 570 may execute software or firmware that permits printer 570 to optimize the calculation of trigonometric and distance calculations in a manner consistent with disclosed embodiments. In another example, an application to optimize the calculation of trigonometric and distance calculations may be resident on computer 510 and operate on data intended for printer 570. In general, applications may execute in whole or in part on at least one computer 510 and/or printers 570 in the system. The embodiments described herein are exemplary only and other embodiments and implementations will be apparent to one of ordinary skill in the art.

Exemplary printer 570 may contain bus 574 that couples CPU 576, firmware 571, memory 572, input-output ("I/O") module 581, print engine 577, and secondary storage device 573. Exemplary printer 570 may also contain other Application Specific Integrated Circuits (ASICs), and/or Field Programmable Gate Arrays (FPGAs) 578 that are capable of executing portions of an application to optimize the processing of function based object operations in interpreted page description languages. In some embodiments, exemplary printer 570 may also be capable of executing software including, a printer operating system, various PDL processing and optimization routines, parsing and conversion routines, database management software, software to process print job requests, printer status requests, printer configuration software, as well as other appropriate application software.

Exemplary I/O module 581 may also permit communication with computer 510 over network 540. Information received from computer 510 and/or print controllers 575 may be processed by I/O module 581 and stored in memory 572. I/O module 581 may also notify CPU 576 about the communications. The communications may include data, commands, information pertaining to the location and formatting of trigonometric or distance tables, capability requests, status requests, responses, and/or acknowledgements according to the protocol being used. CPU 576 may retrieve any information stored in memory 572 and process the information further.

Exemplary CPU 576 may be a general-purpose processor, a special purpose processor, or an embedded processor. CPU 576 can exchange data including control information and instructions with memory 572 and/or firmware 571. Memory 572 may be any type of Dynamic Random Access Memory ("DRAM") such as but not limited to SDRAM, or RDRAM. Firmware 571 may hold instructions and data including but not limited to a boot-up sequence, one or more pre-defined routines including routines to: calculate trigonometric or distance functions, compilers for programming languages, automatic code generation routines, optimization routines for the processing of function based object operations in interpreted page description languages; process incoming requests and messages; compose outgoing responses and messages; as well as routines for configuration management, routines for document processing, and other code. In some embodiments, code and data in firmware 571 may be copied to memory 572 prior to being acted upon by CPU 576. Data and instructions in firmware 571, including any trigonometric and/or distance routines, may be upgradeable using one or more of computer 510, network 540, removable media coupled to printer 570, and/or secondary storage 573.

Exemplary CPU 576 may act upon instructions and data and provide control and data to ASICs/FPGAs 578 and print engine 577 to generate printed documents. In some embodiments, documents may be sent from computer 510 to printer 570 for printing. ASICs/FPGAs 578 may also provide control and data to print engine 177. FPGAs/ASICs 178 may also implement one of configuration management, message processing, and other print related algorithms. Intermediate and final printable data, messages, printer status, and configuration information pertaining to one or more printers 170 may be stored in memory 172 or secondary storage 173.

The methods described herein have been described with respect to printers and printing processes. However, the principles of the inventions described herein may find application to displaying graphics to a display, such as the display 590 shown in FIG. 5. In this exemplary embodiment, the methods described in FIGS. 2 and 4 may be performed when a request to render an image to a display device is received. Software and/or hardware for performing the methods of FIGS. 2 and 4 may reside on computing device 510 and/or removable media drives 550. Computer device 510 may comprise a processor (not shown) for performing the steps of the methods described in FIGS. 2 and 4. In certain embodiments, display 590 may comprise one or more processors and/or memories which perform these functions and store the trigonometric and distance tables.

Other implementations will be apparent to those skilled in the art from consideration of the specification and practice of disclosed embodiments. It is intended that the specification and examples be considered as exemplary only, with its true scope and spirit being indicated by the following claims.

The invention claimed is:

1. A non-transitory, computer-readable medium that stores instructions which, when executed by a processor, perform a method for optimizing printing of a print job comprising graphics by a printer, the method comprising:
   calculating a number of sub tables for the print job, based on specified resolution and page size;
   generating at least one distance sub table, each sub table comprising a range of distance-squared values, each value in a sub table separated from the next value in the same sub table by a distance-squared increment for the sub table;
   determining if a job command in the print job requires a distance calculation; and
   if so, obtaining at least one distance value from the at least one distance table based on information in the job command.

2. The medium of claim 1, wherein obtaining at least one distance value from the at least one distance tables based on information in the job command further comprises:
   computing the distanced squared;
   choosing one of the at least one distance sub table;
   computing an index into the sub table based on the sub table increment of the chosen distance sub table; and
   obtaining a distance value from the chosen distance sub table based on the index.

3. The computer-readable medium of claim 1, wherein the step of determining a number of sub tables for the print job, based on specified resolution and page size further comprises:
   determining a set of most likely page size and resolution combinations; and
   generating at least one distance table only for the most likely page size and resolution combinations.

4. The computer-readable medium of claim 3, wherein the step of determining the set of most likely page size and resolution combinations is determined based on the print job.

5. The computer-readable medium of claim 3, wherein the step of determining the set of most likely page size and resolution combinations is determined based on a characteristic of the printer.

* * * * *